T. LUND.
NAIL DRIVING MACHINE.
APPLICATION FILED SEPT. 16, 1908.
996,656.
Patented July 4, 1911.
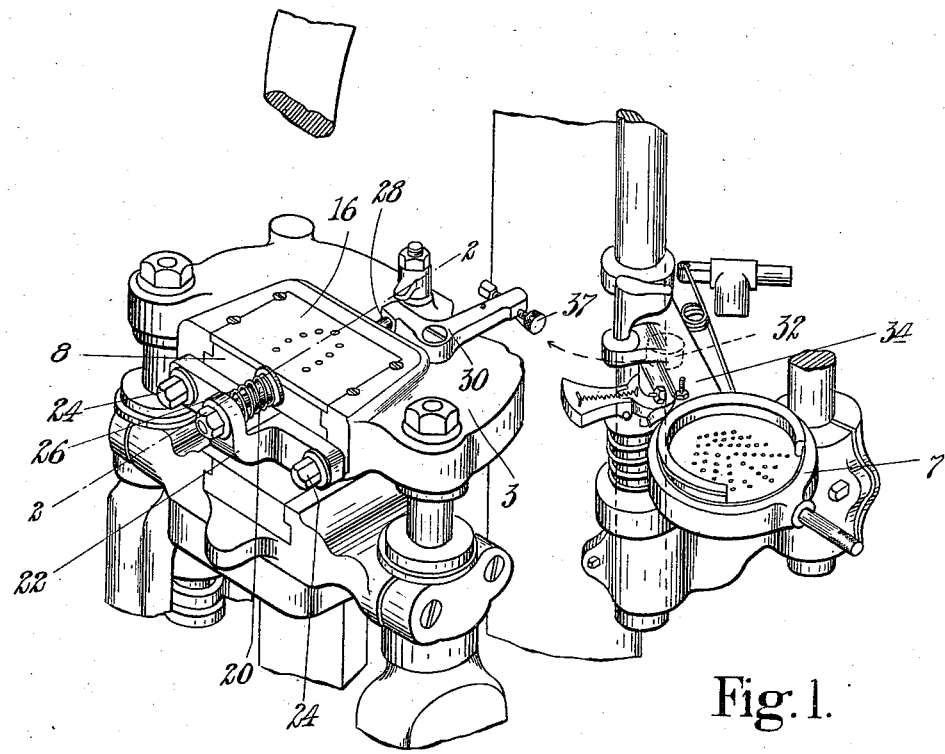
Fig. 1.
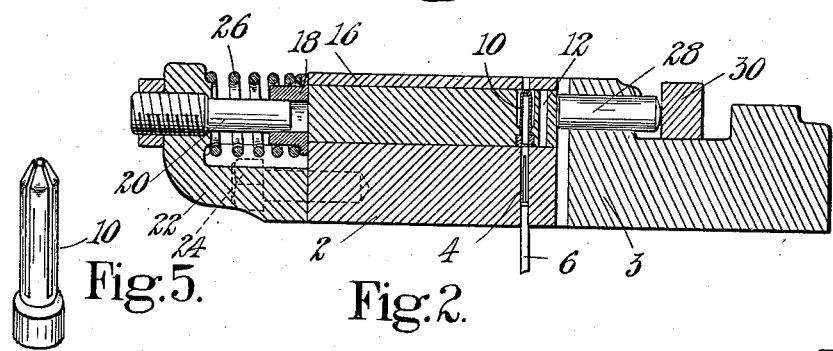
Fig. 5. Fig. 2.
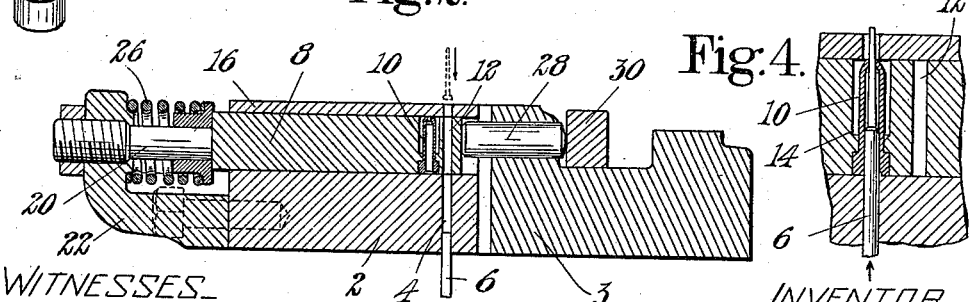
Fig. 4.
WITNESSES
Fig. 3.
INVENTOR

UNITED STATES PATENT OFFICE.

THOMAS LUND, OF BEVERLY, MASSACHUSETTS, ASSIGNOR TO UNITED SHOE MACHINERY COMPANY, OF PATERSON, NEW JERSEY, A CORPORATION OF NEW JERSEY.

NAIL-DRIVING MACHINE.

996,656.  Specification of Letters Patent.  Patented July 4, 1911.

Application filed September 16, 1908. Serial No. 453,332.

*To all whom it may concern:*

Be it known that I, THOMAS LUND, a citizen of the United States, residing at Beverly, in the county of Essex and Commonwealth of Massachusetts, have invented certain Improvements in Nail-Driving Machines, of which the following description, in connection with the accompanying drawings, is a specification, like reference characters on the drawings indicating like parts in the several figures.

This invention relates to nail driving machines and more particularly to machines for inserting nails in which the nails are driven upwardly into the work by suitable drivers from the conduits of a nail block.

In the use of heel nailing machines as commonly constructed, it is necessary in driving headed nails or wedge-shaped nails to employ a nail block provided with nail conduits of a diameter sufficiently large to accommodate the nails at their headed or widest ends. Under these conditions, the pointed ends of the nails are not accurately positioned within the nail conduits and therefore the insertion of the nails into the work is not accurately controlled. To avoid this objection it has been proposed to employ nail guiding devices which are constructed and arranged to position the pointed ends of the nails in the nail conduits, in order that the nails may be guided as they are driven into the work. Heretofore in nail driving machines in which the nails are driven upwardly into the work by suitable drivers, from the conduits of the nail block, it has been impractical to employ nail guiding devices to guide the insertion of nails into the work as the presence of the guiding devices in the conduits of the nail block has interfered with the entrance of the nails into the nail block. For example the presence of such devices has prevented the employment of a nail carrier to supply nails to the nail block as the guiding devices have prevented the loading of nails by gravity from the pockets of the carrier into the conduits of the nail block. Moreover, where the nails have been manually inserted in the conduits of the nail block the nail guiding devices have offered resistance to the insertion of the nails and have thus rendered it difficult for the operator to supply nails to the nail block.

The object of this invention is to provide a nail driving machine of the above form in which nail guiding devices may be used without interfering with the passage of the nails into the conduits of the nail block in the loading operation.

With this object in view a feature of the invention consists in a nail block provided with nail guiding devices constructed to position the pointed ends of the nails free from contact with the walls of the nail conduits prior to the entrance of the nails into the work, and means for withdrawing the nail guiding devices from their operative position to permit the supply of nails to the nail block. In the construction shown, the nail guiding devices are normally held in the pathway of the nails driven from the nail block and are withdrawn from this position by force transmitted from a moving element of the machine. This element may conveniently be the nail carrier commonly employed in heel nailing machines to convey nails from a nail receiving position to a nail delivering position over the nail block. The arrangement shown is such that the movement of the nail carrier into nail delivering position causes the withdrawal of the nail guiding devices from operative position in order to permit nails to descend by gravity from the nail carrier to the conduits in the nail block.

In my invention, as herein disclosed, I employ a nail block having a suitable number of nail conduits and a plate mounted for sliding lateral movement in its upper part and provided with passages containing nail guiding devices arranged to be brought by the movement of the plate in line with the nail conduits to guide the insertion of nails driven from the nail block into the work. The sliding plate has a suitable number of auxiliary passages therein which are also adapted to be brought into line with the nail conduits for the purpose of guiding nails in their fall from the pockets of the nail carrier to the said nail conduits.

In the preferred embodiment of the invention, resilient means are employed to normally hold the sliding plate in such position that the passages containing the nail guiding devices will normally be in line with the nail conduits and means, actuated by the movement of the nail carrier to its nail delivering position over the nail block, are provided to move the sliding plate against the resistance of the resilient means to a position in which the auxiliary passages are in line with the nail conduits to permit nails to fall from said nail carrier through the auxiliary passages into the nail conduits.

It is considered to be within the scope of the present invention to mount the nail guiding devices for movement to and from a position in which they lie in the path of the nails driven from the nail block in any suitable way, and, moreover, the nail guiding devices may be automatically moved to and from effective position by means of any moving element of the machine, such as the main shaft, or, if desired, they may be actuated by a device manipulated by the operator.

Other features of the invention will be hereinafter described in the specification and pointed out in the claims.

In the drawings,—Figure 1 is a view in perspective of a sufficient portion of a nailing machine with my improvement added thereto to enable my invention to be understood; Fig. 2 is a section on the line 2—2 of Fig. 1, showing the nail block with a nail centering device in effective position therein; Fig. 3 is a similar view of the nail block showing the nail centering device withdrawn from effective position; Fig. 4 is an enlarged sectional view of a portion of the nail block showing the nail centering device in position to sustain a nail about to be driven into the work; Fig. 5 is a view of a preferred form of nail centering device.

The present embodiment of the invention is herein shown applied to a heel attaching machine of the type disclosed in United States Letters Patent to B. F. Mayo, 884,513, April 14, 1908, but it will be understood that the invention is not limited for use with a machine of this type.

The nail block 2, carried by a suitable head 3 and having a number of vertical nail conduits 4, the driver 6 for said conduits and the auxiliary nail carrier 7 may be substantially as shown in the above patent and will not be described in detail in this application.

According to the present embodiment of the invention, a recess is formed in the upper face of the nail block, extending to an edge thereof, and in said recess a plate 8 is mounted for sliding lateral movement. The sliding plate 8 is provided with a suitable number of nail guiding devices 10 and an equal number of vertical auxiliary passages 12. The nail guiding devices 10 preferably comprise cylindrical tubes that are tapered and slitted at their upper ends to form spring jaws adapted to engage the sides of a nail within the tube to suitably determine the position of the nail with relation to the sides of the nail conduit and said guiding devices are secured in any suitable way in vertical passages 14 formed in the sliding plate. The guiding devices and auxiliary passages are arranged respectively in the sliding plate in position to be successively brought in line with the nail conduits 4 by the movement of said sliding plate.

A cover plate 16 is provided for the recess in the nail block and is supported flush with the upper surface of the block and provided with nail openings in line with the conduits 4. Secured upon the outer end of the sliding plate is a shouldered sleeve 18 arranged for limited sliding movement upon a horizontal rod 20 which is adjustably supported by a suitable screw-threaded connection in a bracket 22 secured by screws 24 to the head 3. A coil spring 26 mounted upon the horizontal rod 20 and engaging at its outer end the bracket 22 and at its inner end the shoulder upon the sleeve 18 tends to move the sliding plate inwardly until the sleeve strikes the side of the nail block in which position the nail guiding devices are in line with the conduits in the nail block, as shown in Fig. 2.

A pin 28 is slidingly mounted in the head 3 in position to engage the inner end of the plate 8 and has a projecting end adapted to be engaged by an arm of a bell-crank lever 30 which is pivoted on said head. The other arm of the bell-crank lever is arranged to be actuated by a roller 32 upon the arm 34 of the auxiliary nail carrier 7 when said carrier is brought into nail delivering position over the nail block. The bell-crank lever 30 is provided with an adjustable set screw 37 which is arranged in the path of the roller 32 in such manner that movement of the nail carrier 7 to nail delivering position over the nail block will move the sliding plate 8 to its outer position, as shown in Fig. 3, in which the passages 12 are in line with the conduits 4, thus providing a clear passage for the nails to fall from the pockets of the nail carrier into the conduits in the nail block. As will be obvious, the set screw 37 may be adjusted to compensate for wear of the parts, and thus insure that the passages 12 shall always be in line with the conduits in the nail block when the nail carrier is in nail delivering position. The rod 20 is preferably of a suitable length to engage the outer end of the sliding plate 8 to act as a stop to determine the outer position of the plate so that the passages 12 shall be in line with the conduits in the nail block.

In the operation of the mechanism shown, the nail carrier, having been provided with nails, is moved into its nail delivering position over the nail block and during such movement the roller upon the arm of the nail carrier will engage the set screw on the bell-crank lever causing the sliding plate to be moved against the resistance of the spring to its outer position in which the passages 12 are in line with the conduits in the nail block, as shown in Fig. 3, to guide the nails in their fall from the pockets of the nail carrier into the conduits in the nail block. The nail carrier is then moved away from the nail block to its nail receiving position, and the spring moves the plate to its inner position, as shown in Fig. 2, in which the nail guiding devices are in line with the conduits in the nail block. The machine may then be started to actuate the drivers to drive the nails into the work supported in the usual manner upon the nail block, and as the nail guiding devices are supported in the pathway of the nails driven from the conduits they serve to guide the insertion of the nails into the work.

It will be observed that where the movements of the nail guiding devices are controlled in accordance with the movement of the nail carrier, as in the present embodiment of the invention, the withdrawal of the nail guiding devices from effective position prior to the supply of nails to the nail block and the return of said devices to effective position prior to the nail driving operation are effectually insured. Moreover, with this arrangement the operator is not required to actuate a device independent of the nail carrier in order to control the movement of the nail guiding devices as might otherwise be the case. It will be further observed that the provision of a top plate 16 prevents the work in which the nails are to be driven from coming in direct contact with the sliding plate 8, and this is advantageous in that it obviates any liability of the work being marred by being pressed against the auxiliary passages 12, as would be the case if it were clamped directly upon the sliding plate.

Although in the illustrated embodiment of the invention the nail guiding devices are arranged to guide the nails into the work in a direction substantially perpendicular to the upper surface of the nail block, it will, however, be understood that many features of the invention are not limited for use with guiding devices of this form, as it is within the present invention to employ nail guiding devices which are adapted to guide the nails in oblique directions into the work.

It should be noted that the term "nail guiding device", unless used with a qualifying expression, is intended in the following claims to include any device which controls the position of nails in a nail block prior to the entrance of the nails into the work.

Having described my invention, what I claim as new and desire to secure by Letters Patent of the United States is:—

1. In a machine for driving headed or wedge-shaped nails in which the nails are driven upwardly into the work, a nail driver and a device for yieldingly engaging the opposite sides of the nail adjacent its smaller end to guide it in its movement toward the work, said device being mounted for movement transverse to the path of the nail to permit a nail to be brought into operative relation to said driver.

2. A nail driving machine, having in combination, nail conduit, a driver working in said conduit, a nail guiding device arranged to position the pointed end of a nail free from contact with the walls of the conduit, and means for withdrawing the nail guiding device from effective position to permit supplying a nail to said conduit.

3. A nail driving machine in which the nails are driven upwardly into the work, having in combination, a nail conduit, a driver working in said conduit and means for guiding the insertion of a nail independently of the guiding influence of the walls of the conduit arranged for movement out of alinement with said conduit to permit supplying a nail thereto.

4. A nail driving machine, having in combination, nail driving mechanism, nail guiding devices formed to yieldingly engage the opposite sides of nails and arranged to be held in the pathway of the nails driven by said mechanism, and means for withdrawing the said devices from effective position prior to the supply of nails to the nail driving mechanism.

5. A nail driving machine, having in combination, a nail conduit, a driver working in said conduit, a nail guiding device arranged to be normally held in the pathway of a nail driven from said conduit and means for withdrawing the nail guiding device from effective position to permit supplying a nail to the conduit.

6. A nail driving machine, having in combination, nail driving mechanism, a nail guiding device arranged to be normally held in the pathway of a nail driven by said mechanism, a movable nail carrier, and means actuated by the movement of the nail carrier to nail delivering position for withdrawing the nail guiding device from effective position to permit supplying a nail to the said nail driving mechanism.

7. A nail driving machine, having in combination, nail driving mechanism, a nail guiding device, means arranged to normally hold the guiding device in the pathway of a nail driven by said mechanism, and means arranged to be actuated by a moving element of the machine to withdraw said nail guiding device from effective position to permit supplying a nail to the nail driving mechanism.

8. A nail driving machine, having in combination, nail driving mechanism, a nail guiding device, means constructed to normally hold the guiding device in the pathway of a nail driven by said mechanism, a movable nail carrier to supply nails to the nail driving mechanism, and means actuated by the movement of said carrier to nail delivering position for withdrawing the nail guiding device from the pathway of the nail.

9. A nail driving machine, having in combination, a nail block provided with nail conduits, a plate slidingly mounted therein provided with nail guiding devices and nail passages, yielding means arranged to normally hold the plate in such position that the nail guiding devices are in line with the conduits in the nail block to guide the insertion of nails driven from the nail block, and means for moving the sliding plate against the resistance of the yielding means to a position in which the nail passages are in line with the said conduits to permit nails to be supplied to the nail block.

10. A nail block, having a nail conduit and a recess in its top face extending to an edge of the block, a cover plate for the recess supported flush with the upper surface of the block and having an opening in line with the nail conduit, a plate mounted for sliding movement in the said recess carrying a nail guiding device and having an auxiliary passage, the said guiding device and passage constructed and arranged to be successively brought under the opening in the top plate and in line with the said conduit by the movement of the sliding plate.

11. In a nail driving machine, nail driving mechanism, a nail conduit, a sliding plate having two passages therethrough in one of which is a nail centering device, said plate being movable transversely of said nail conduit to bring first one passage to register with said conduit for feeding a nail to said conduit and then the other passage, containing the nail centering device, to register with said conduit, in order that said device may guide said nail as it is driven through said device into the work.

12. In a nail driving machine, a nail conduit and a driver operating therein, a slidable plate having a nail passage therein, a device in said passage for centering the nail consisting of a member slitted to form jaws constructed to grip yieldingly the point of a nail driven through said passage, said plate, passage and centering device being movable transversely into and out of register and alinement with said nail conduit and driver.

13. A nail driving machine, having in combination, a nail driving member, a conduit in which said member acts, a slidable plate between said conduit and work having a passage which may be brought into register with said conduit for feeding a nail thereto and having another passage containing a nail centering device which in turn may be brought into register with said conduit to guide a nail as it is driven from said conduit into the work.

14. In a nail driving machine, a nail conduit having a nail guiding continuation thereof to guide a nail in the direction of the work, said nail guiding continuation being so constructed and arranged that it may be removed from effective position to permit feeding a nail to said conduit in the opposite direction.

15. In a nail driving machine, a nail conduit, in which a driver operates, a slidable plate having formed therein a continuation of said conduit, a nail guiding device fixed in said conduit continuation and constructed to grip yieldingly opposite sides of the nail as it passes in the direction of the work, said plate being so constructed and arranged that said guiding device may be removed from effective position so that a nail may be fed in the opposite direction into position in front of the driver.

16. In a nail driving machine, a nail conduit, in which a driver operates, a slidable plate having formed therein a continuation of said conduit, a nail guiding device fixed in said conduit continuation and constructed to grip yieldingly opposite sides of the nail as it passes in the direction of the work, and means constructed and arranged for the successive automatic removal of said plate from effective position so that a nail may be fed in the opposite direction into position in front of the driver.

17. A nail driving machine, having in combination, a nail conduit and a driver operating therein, a plate carrying a nail guiding device, said plate being so constructed and arranged that the guiding device may be first interposed between said driver and work in alinement with said conduit, in which position it guides the nail independently of the guiding influence of the walls of the conduit as the nail is driven in the direction of the work, and so that the guiding device may be then disposed to allow a nail to be fed in the opposite direction into position in the conduit in front of the driver.

In testimony whereof I have signed my name to this specification in the presence of two subscribing witnesses.

THOMAS LUND.

Witnesses:
ALLAN H. BARROWS,
BERNARD BARROWS.

Copies of this patent may be obtained for five cents each, by addressing the "Commissioner of Patents, Washington, D. C."